Dec. 30, 1947.   J. J. COOK   2,433,436
ANTISKID DEVICE
Filed May 2, 1947   2 Sheets-Sheet 1
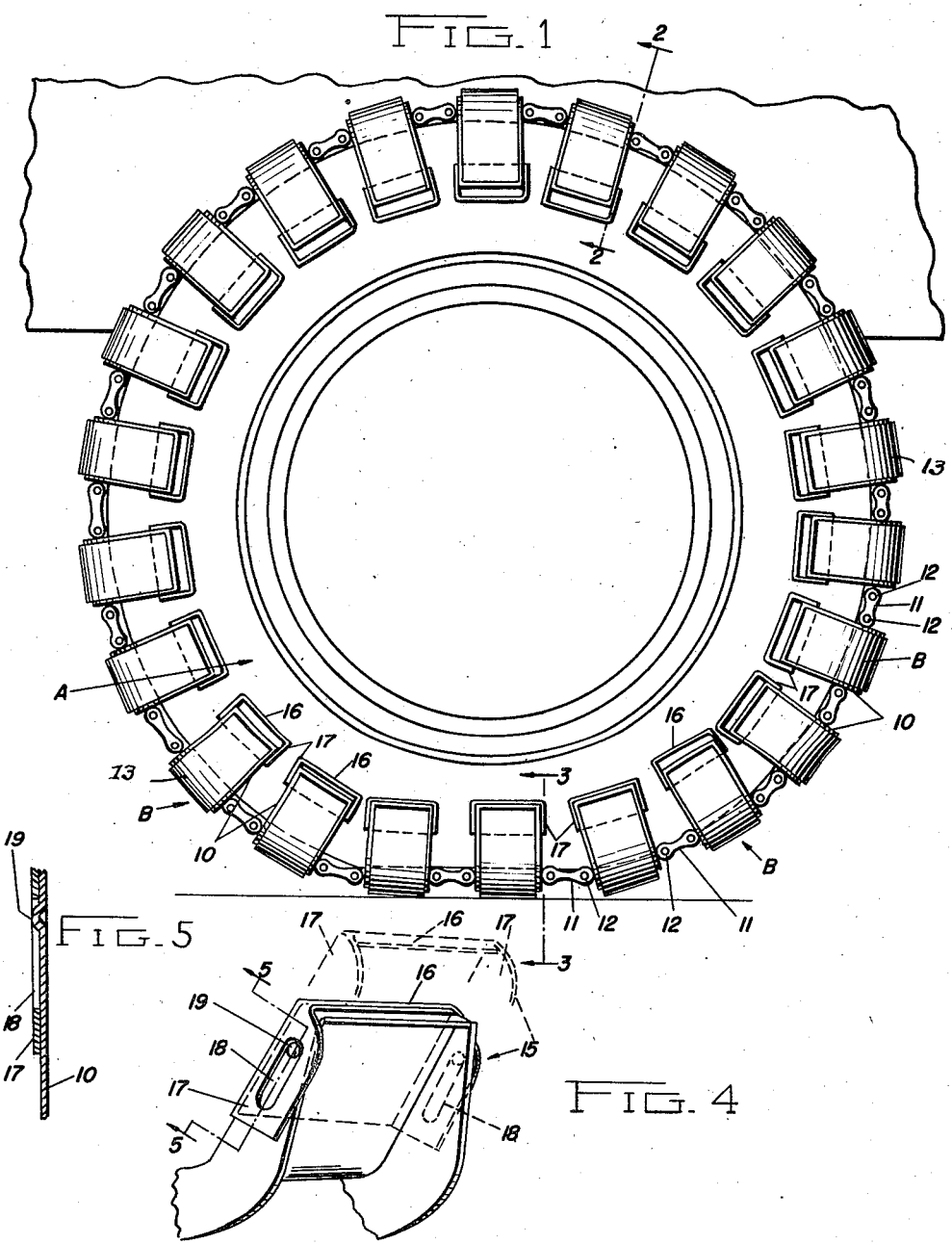
INVENTOR.
JOHN J. COOK
BY
Hauke & Hardesty
ATTORNEYS.

Dec. 30, 1947.  J. J. COOK  2,433,436
ANTISKID DEVICE
Filed May 2, 1947  2 Sheets-Sheet 2
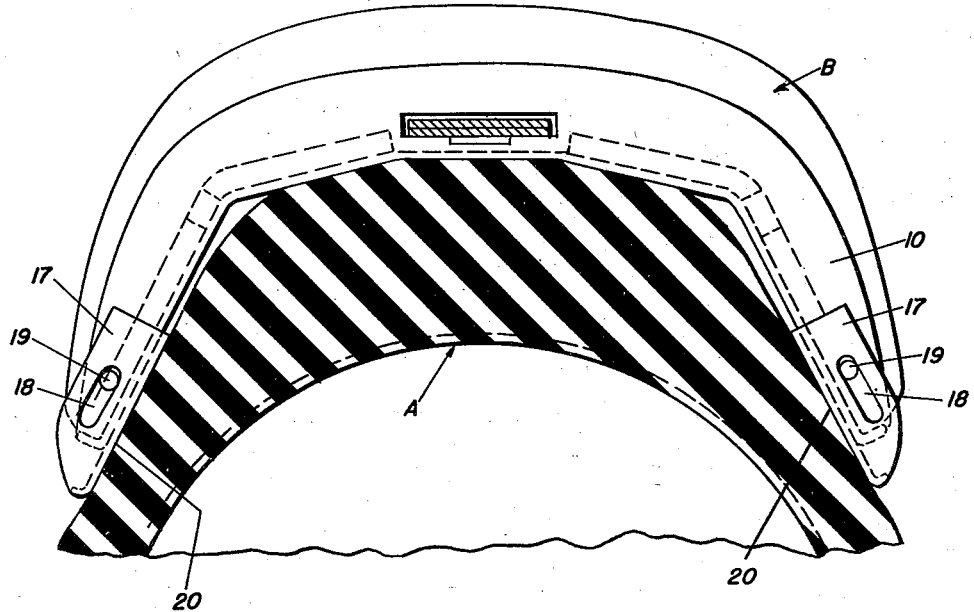
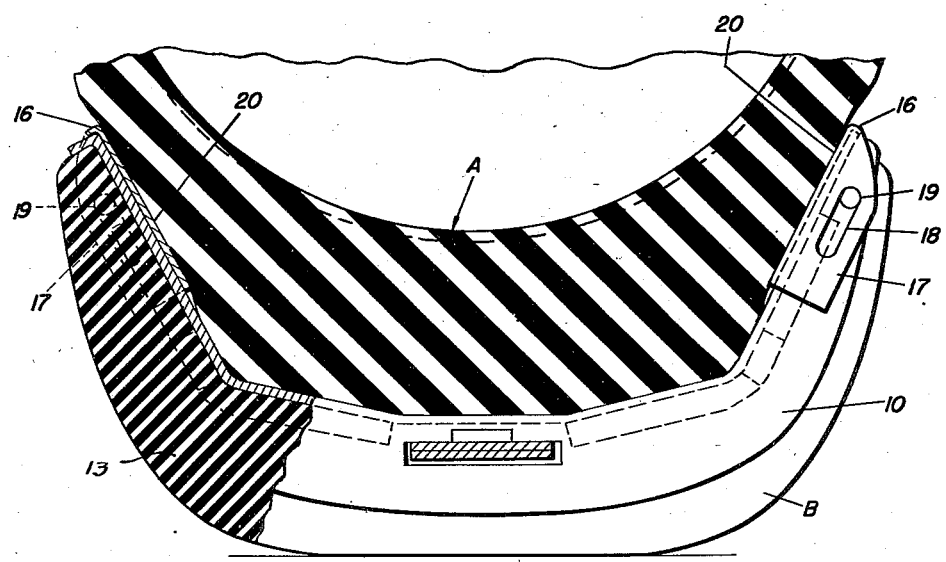
INVENTOR.
JOHN J. COOK
BY Hauke & Hardesty
ATTORNEYS Patented Dec. 30, 1947

2,433,436

UNITED STATES PATENT OFFICE 2,433,436

ANTISKID DEVICE

John J. Cook, Detroit, Mich., assignor to John J. Cook Manufacturing Company, Detroit, Mich., a corporation of Michigan Application May 2, 1947, Serial No. 745,593

7 Claims. (Cl. 152—225)

This invention relates to an anti-skid device for rubber tired vehicle wheels, and more particularly to an anti-scuffing member carried by said device.

Anti-skid devices are in general secured about the periphery of the tire as tightly as possible, and usually no attention is given to the fact that the tire breathes when operating in service, and that this tire distortion causes the anti-skid device to rub on the tire side wall, thus causing excessive tire wear. In heavy duty vehicles, carrying bigger and heavier loads than the ordinary passenger car, this wear is decidedly noticeable and objectionable.

It is an object of the present invention to construct an improved anti-skid chain by providing the units thereof with tire anti-scuffing member which contacts the tire, and which moves relatively to the metal structure of said units, whereby to take all the wear normally resulting from relative movement of the tire side wall and said chain units.

For a more detailed understanding of the invention, reference may be had to the accompanying drawings illustrating a preferred embodiment of the invention, and in which Fig. 1 is a side elevational view of a rubber tired vehicle wheel, showing the tire as same is subjected to load while in service.

Fig. 2 is a transverse sectional view taken substantially on the line 2—2 of Fig. 1.

Fig. 3 is a transverse sectional view taken substantially on the line 3—3 of Fig. 1.

Fig. 4 is a fragmentary perspective view of the anti-scuffing device; and

Fig. 5 is a detailed sectional view taken on the line 5—5 of Fig. 4.

The anti-skid device as illustrated in the accompanying drawings is described and claimed in my copending application for patent Serial No. 704,411, filed October 19, 1946, for Anti-skid device, and the present anti-scuffing device is constructed and arranged for assembly with each of the units which comprise said anti-skid device.

The anti-skid device comprises a unit device B providing a U-shaped metal channel structure 10 lying transversely of a vehicle tire A, said channel structure substantially conforming to the cross-sectional contour of the tire as shown in Figs. 2 and 3. The units are linked together by means of the links 11 which are hinged as at 12, and a rubber block 13 is molded into and secured to the metal channel structure 10.

When in service, a tire under a vehicle load will flatten out as it contacts the ground, the greater load will flatten out as it contacts the ground; the greater the load, the more the distortion. The anti-scuffing devices 15 are telescoped onto both ends of the metal channel structures 10, each of said devices comprising a channel shaped member enclosing the channel 10 and provided with an end flange 16 engaging or abutting the ends of said channel 10 to limit the inward movement. The sides 17 of the channels 15 are slotted as at 18 and receive a projection 19 carried by the channel 10 to slidably receive said anti-scuffing device to said channel 10.

The tire is initially compressed under load as the vehicle wheel rotates, the tire being compressed into the U-channel 10, and as that part of the tire leaves the ground, the tire is free to expand and it thus tends to rub or scuff against the end of said channel 10.

I have provided this anti-scuffing device comprising a channel member provided with side and end flanges as described above which are constructed to telescope with respect to the metal channel 10, and the bottom face 20 of the anti-scuffing device contacts the exterior surface of the tire, and thus moves with the tire as same is relieved from the compression as the vehicle wheel rotates in service. Since there is relatively no movement of the tire relative to the surface 20, all the wear is taken by the device 15 as same moves with respect to said channel 10.

It will be apparent to those skilled in the art which the invention pertains that various modifications and changes may be made therein without departing from the spirit of the invention or from the scope of the appended claims.

I claim:

1. In an anti-skid device for vehicle wheels and comprising a plurality of interlinked generally U-shaped sections adapted for assembly about a vehicle tire periphery, each of said sections comprising a metal structure extending transversely of the tire and constructed to substantially conform to the transverse contour of said tire, and an anti-scuffing guard slidably supported on the extreme ends of each of said metal structures and closely contacting the tire side wall, said guard operable in service to move with the tire wall relative to said metal structure.

2. In an anti-skid device for vehicle wheels and comprising a plurality of interlinked generally U-shaped sections adapted for assembly about a vehicle tire periphery, each of said sections comprising a metal structure extending transversely of the tire and constructed to substantially conform to the transverse contour of said tire, and an anti-scuffing guard slidably supported on the extreme ends of each of said metal structures and comprising a relatively flat metal base lying intermediate the tire side wall and inner face of the said metal structure, the aforesaid guard operable in service to closely contact the tire side wall and move with the tire side wall relative to said metal structure.

3. In an anti-skid device for vehicle wheels and comprising a plurality of interlinked generally U-shaped sections adapted for assembly about a vehicle tire periphery, each of said sections comprising a metal structure extending transversely of the tire and constructed to substantially conform to the transverse contour of said tire, and an anti-scuffing guard slidably supported on the extreme ends of each of said metal structures and comprising a channel member telescoping on said metal structure, the base portion of said channel member lying intermediate the tire side wall and the inner face of said metal structure, the base portion of said guard closely contacting the tire side wall and operable to move with the tire relative to said metal structure.

4. In an anti-skid device for vehicle wheels and comprising a plurality of interlinked generally U-shaped sections adapted for assembly about a vehicle tire periphery, each of said sections comprising a metal channel extending transversely of the tire and constructed to substantially conform to the transverse contour of said tire, and an anti-scuffing guard slidably supported on the extreme ends of each of said metal channels and each comprising a channel member telescopically fitting with the metal channel of said U-shaped section, said supporting means for said guard comprising projections carried by the side portions of one of said channels cooperating with a slot in said other channel to provide for sliding movement of one channel with respect to the other, the base portion of said channel member lying intermediate the tire side wall and the inner face of the metal channel of said U-shaped section, the base portion of said guard closely contacting the tire side wall and operable to move with the tire relative to said metal channel.

5. In an anti-skid device for vehicle wheels and comprising a plurality of interlinked generally U-shaped sections adapted for assembly about a vehicle tire periphery, each section including a metal structure extending transversely of the vehicle tire, and an anti-scuffing guard slidably supported by said metal structure and arranged intermediate the tire side wall and the said metal structure and operable in service to bear against the side wall face of said tire with a minimum of relative movement and to slide relative to said metal structure.

6. In an anti-skid device for vehicle wheels and comprising a plurality of interlinked generally U-shaped sections adapted for assembly about a vehicle tire periphery, each section including a metal structure extending transversely of the vehicle tire, and an anti-scuffing guard arranged intermediate the tire side wall and the said metal structure and operable in service to bear against the side wall face of said tire with a minimum of relative movement and to slide relative to said metal structure, said guard telescopically slidably supported by said metal structure and provided with an outwardly turned end flange engaging the end of said metal structure to limit inward movement of the guard.

7. In an anti-skid device for vehicle wheels and comprising a plurality of interlinked generally U-shaped sections adapted for assembly about a vehicle tire periphery, each section including a metal structure extending transversely of the vehicle tire, and an anti-scuffing guard arranged intermediate the tire side wall and the said metal structure and operable in service to bear against the side wall face of said tire with a minimum of relative movement and to slide relative to said metal structure, said guard being provided with elongated slots receiving a fixed projection carried by said metal structure to provide for a limited sliding movement of said guard relative to said structure, said guard closely contacting said tire and having a minimum of movement relative to said tire as said tire moves relative to said structure when in service.

JOHN J. COOK.